United States Patent [19]
Weidner, Sr. et al.

[11] Patent Number: 5,536,913
[45] Date of Patent: Jul. 16, 1996

[54] SUBMERGED-ARC WELDING APPARATUS

[75] Inventors: William R. Weidner, Sr., Oak Creek;
William R. Weidner, Jr., Milwaukee;
Giuseppe Picione, Franklin, all of Wis.

[73] Assignee: Harnischfeger Corporation, Brookfield, Wis.

[21] Appl. No.: 335,950

[22] Filed: Nov. 8, 1994

[51] Int. Cl.[6] .................................................. B23K 9/18
[52] U.S. Cl. ................. 219/73; 219/124.31; 219/125.11
[58] Field of Search .................................. 219/73, 124.1, 219/124.22, 124.31, 125.1, 125.11; 228/25

[56] References Cited

U.S. PATENT DOCUMENTS

| | | | |
|---|---|---|---|
| 2,402,938 | 6/1946 | Stringham | 219/73 |
| 2,749,421 | 6/1956 | Mikulak et al. | 219/124.22 |
| 3,033,975 | 5/1962 | Thomas et al. | 219/125.11 |
| 3,420,979 | 1/1969 | Gowan | 219/73 |
| 3,543,989 | 12/1970 | Cooper | 228/25 |
| 3,769,486 | 10/1973 | Braucht | 219/125.1 |
| 3,795,785 | 3/1974 | Smith | 219/124.4 |
| 4,539,465 | 9/1985 | Bosna | 219/136 |
| 4,540,870 | 9/1985 | Kaufmann | 219/124.22 |
| 5,298,710 | 3/1994 | Acheson et al. | 219/125.11 |

FOREIGN PATENT DOCUMENTS

| | | | |
|---|---|---|---|
| 610643 | 6/1978 | U.S.S.R. | 219/125.11 |

*Primary Examiner*—Clifford C. Shaw
*Attorney, Agent, or Firm*—Michael, Best & Friedrich

[57] ABSTRACT

Apparatus for making a circular weld using the submerged-arc welding process, the apparatus comprising a generally horizontal, extendible and contractible boom having inner and outer ends, the boom being supported adjacent the inner end for rotation about a vertical axis, a mounting member mounted on the outer end of the boom for vertical movement relative thereto, a swing arm mounted on the mounting member for pivotal movement relative thereto about generally vertical axis, a support member mounted on the swing arm for pivotal movement relative thereto about a generally horizontal axis, a welding torch fixed to the support member for movement therewith, a spool supported by the boom for rotation relative thereto about a generally horizontal spool axis, and an electrode wire wound around the spool and extending between the spool and the torch.

18 Claims, 4 Drawing Sheets

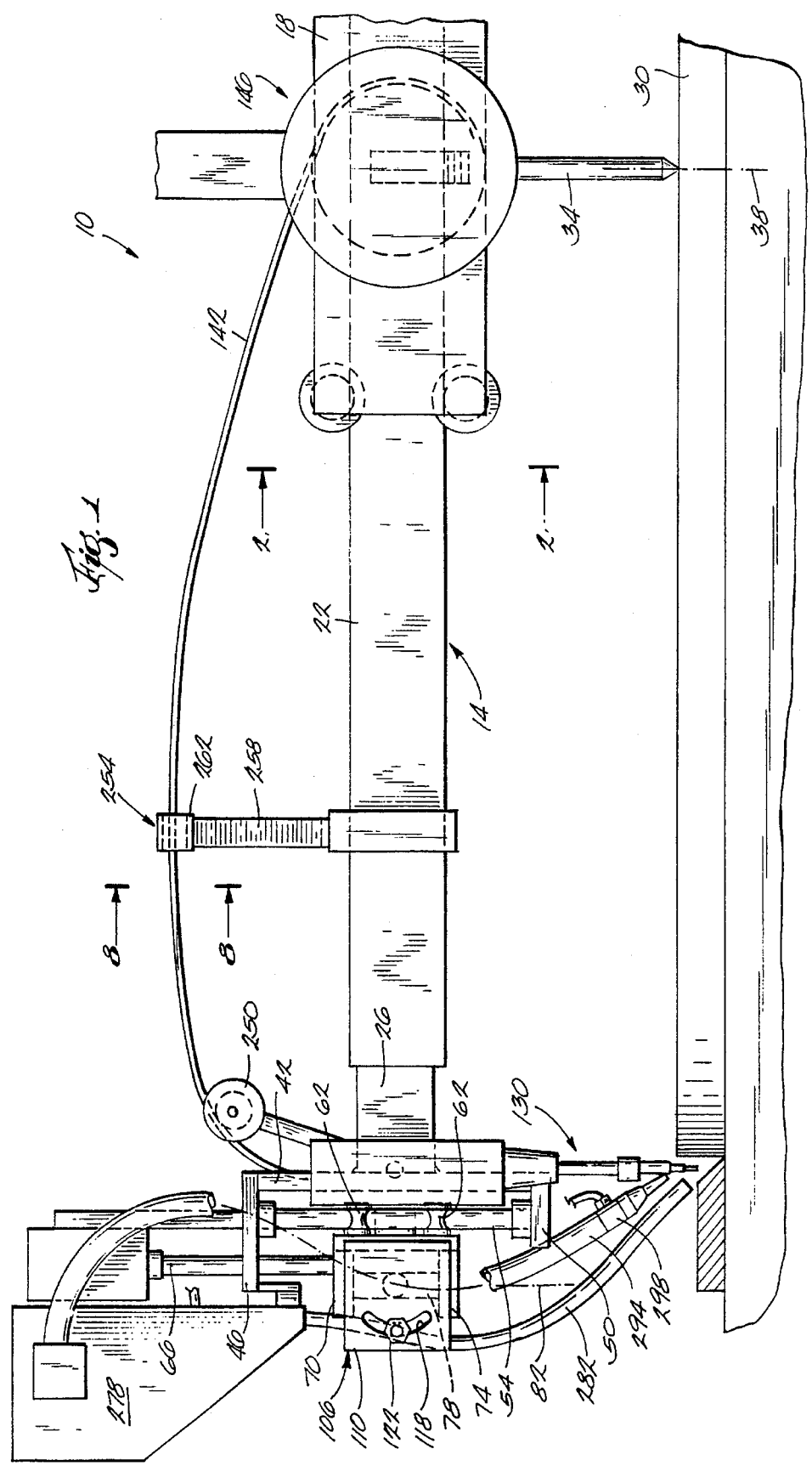

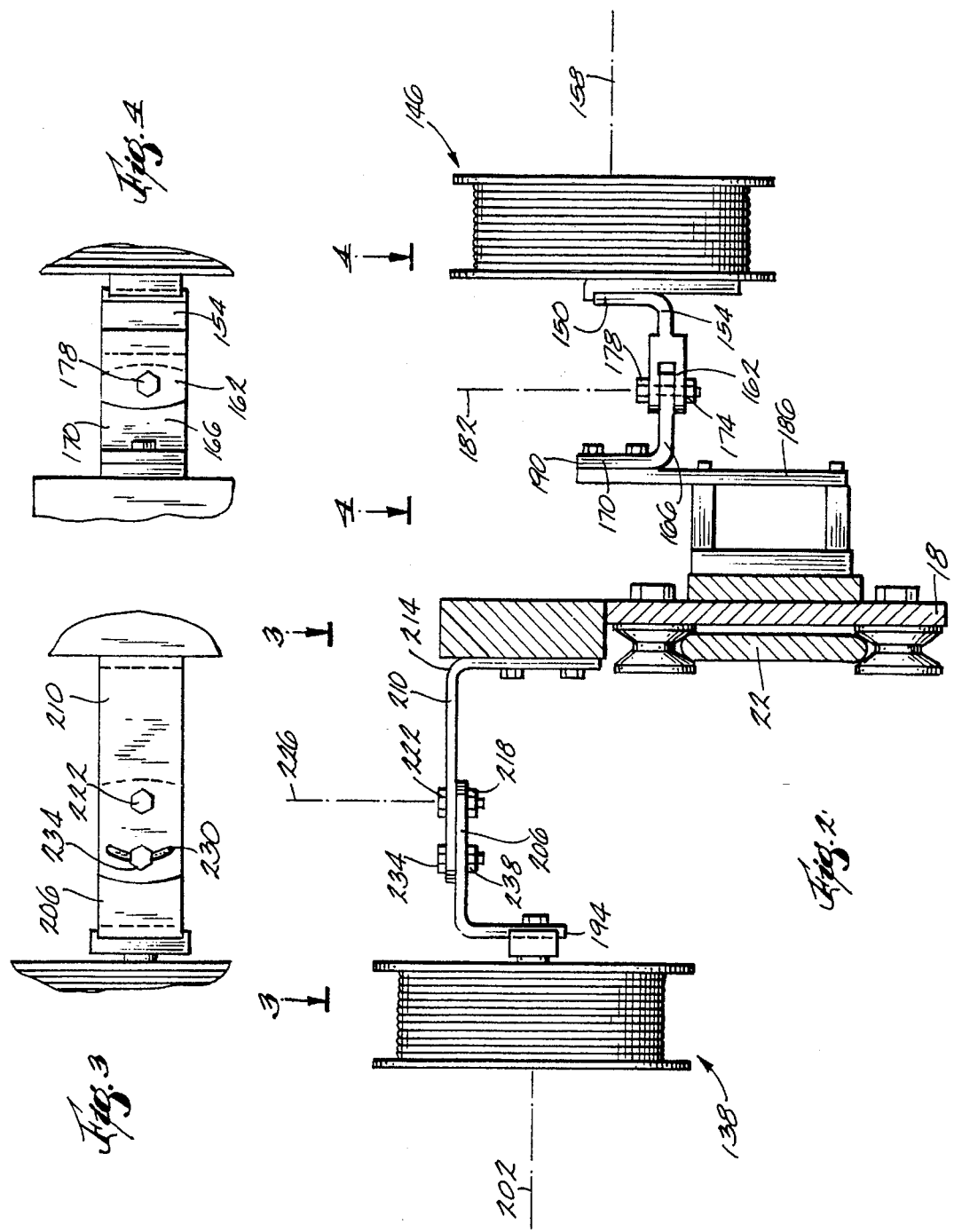

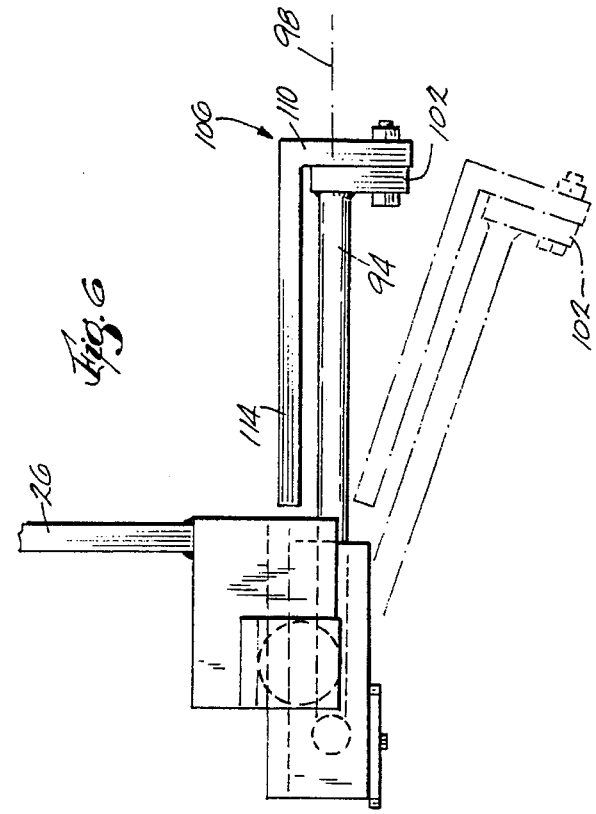
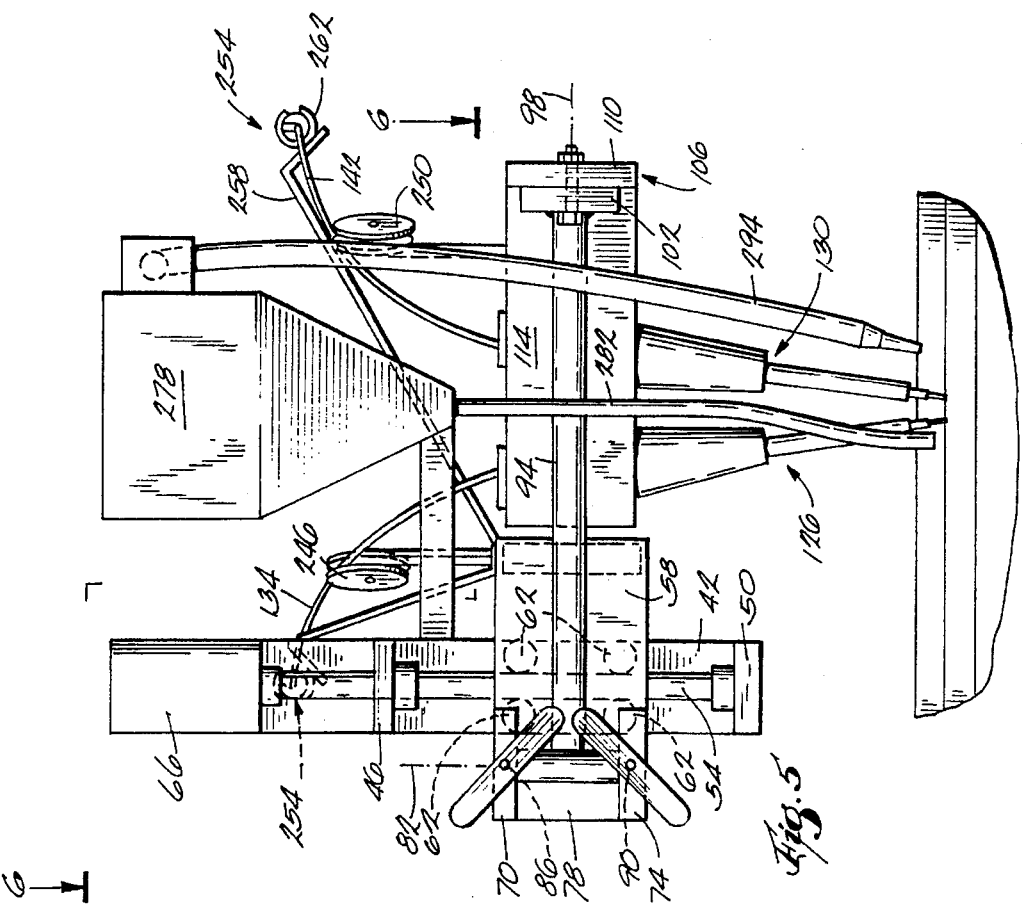

SUBMERGED-ARC WELDING APPARATUS

BACKGROUND OF THE INVENTION

The invention relates to welding apparatus, and more particularly to submerged-arc welding apparatus. The invention also relates to the manufacture of electric mining shovels, hydraulic mining shovels, dragline mining shovels and related heavy mining machinery.

In submerged-arc welding, flux is deposited along the weld path, and an arc is created between a continuous electrode wire and the metal being welded. The arc melts some of the flux and is submerged in the liquid slag so produced. It is known to provide a circular weld by fixing a submerged-arc welding torch on the end of an arm that rotates about the center of a circle.

Circular welds on heavy mining machinery have traditionally been accomplished by using hand-held semi-automatic welding apparatus. Because of the size and length of the welds, the weld appearance is inconsistent and includes many start and stop locations. The hand-held process requires that the faces and start-stop locations be ground and dressed up. Machining of these locations is difficult due to slag and porosity in the welds.

SUMMARY OF THE INVENTION

The invention provides an improved apparatus for making circular welds on heavy mining equipment. The apparatus utilizes the submerged-arc welding process so that a continuous weld (no starts and stops) can be made. The weld produced is sound and of high quality. Grinding of the weld face is substantially eliminated.

The apparatus comprises a generally horizontal telescoping boom. The inner end of the boom is supported for rotation about a vertical axis which defines the center of the circle along which the weld is made. A mounting member or plate is mounted on the outer end of the boom for vertical movement relative to the boom. Preferably, the mounting plate is supported by rollers for movement along a vertical rod fixed to the end of the boom, and an electric slide and screw assembly moves the mounting plate along the rod. The inner end of a swing arm is mounted on the mounting plate for pivotal movement relative thereto about a vertical axis. The swing arm extends horizontally. A support member is mounted on the outer end of the swing arm for pivotal movement relative thereto about the longitudinal axis of the swing arm. Thus, the support member is moveable vertically relative to the outer end of the boom and is pivotable relative to the outer end of the boom about both horizontal and vertical axes. This allows great flexibility in positioning the support member relative to the end of the boom.

Lead and trailing welding torches are fixed to the support member for movement therewith, so that the position of the torches relative to the end of the boom can be adjusted by adjusting the position of the support member. The torches preferably extend downwardly from the support member. Electrode wires for the two torches are provided by two spools supported by the boom adjacent the inner end thereof. Each spool rotates relative to the boom about a horizontal axis and is pivotable relative to the boom about a vertical axis so that the angle of the spool relative to the boom is adjustable. This allows the position of each spool to be adjusted to compensate for adjustment of the position of the associated welding torch. Each electrode wire is supported and guided by an insulated wire guide mounted on the boom between the spools and the torches.

A flux hopper is fixed to the outer end of the boom, and a flux hose having an outlet end adjacent the welding torches deposits flux from the flux hopper along the weld path. A pressurized flux tank is mounted adjacent the inner end of the boom, and a flux supply hose communicates between the tank and the hopper. A flux recovery hose or vacuum hose has an inlet end adjacent the welding torches and has an outlet end communicating with the hopper. An air valve in the flux recovery hose communicates with a source of compressed air for creating air flow toward the hopper so that the hose sucks up excess flux. The air valve is located close to the inlet end of the vacuum hose so as to provide adequate suction.

Other features and advantages of the invention will become apparent to those skilled in the art upon review of the following detailed description, claims and drawings.

DESCRIPTION OF THE DRAWINGS

FIG. 1 is a side elevational view, partially broken away, of an apparatus embodying the invention.

FIG. 2 is a view taken along line 2—2 in FIG. 1.

FIG. 3 is a view taken along line 3—3 in FIG. 2.

FIG. 4 is a view taken along line 4—4 in FIG. 2.

FIG. 5 is a left and elevational view of the apparatus as shown in FIG. 1.

FIG. 6 is a view taken along line 6—6 in FIG. 5.

Figure 8:
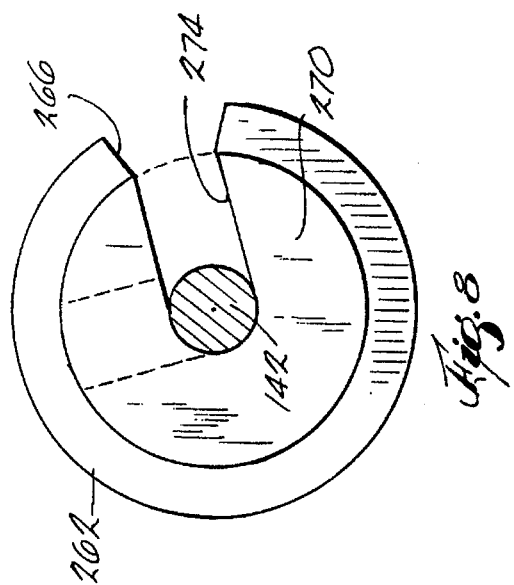
FIG. 8 is a view taken along line 8—8 in FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An apparatus 10 embodying the invention is illustrated in the drawings. The apparatus 10 comprises (see FIG. 1) a generally horizontal telescoping boom 14 including three telescoping sections 18, 22 and 26 supported relative to each other by rollers or other suitable means. The right section 18 defines the inner end of the boom 14, and the left section 26 defines the outer end of the boom 14. The inner end of the boom 14 is supported on a workpiece 30 by a depending centering pin 34 extending along a vertical axis 38, so that the boom 14 is rotatable about the axis 38. The inner end of the boom 14 is preferably further supported by and can be moved by a hoist or other apparatus (not shown).

A vertical plate 42 (see FIGS. 1 and 5) is fixed to the outer end of the boom 14. An upper plate 46 extends outwardly from the upper end of the plate 42, and a lower plate 50 extends outwardly from the lower end of the plate 42. A guide rod 54 extends vertically between the upper and lower plates 46 and 50, and a vertically extending mounting member or plate 58 is supported for vertical movement along the guide rod 54 by upper and lower pairs of rollers 62. The rollers 62 are rotatably mounted on the rear of the plate 58 and roll along the guide rod 54. The plate 58 is moved vertically along the rod by a conventional electric slide and screw assembly 66 mounted on top of the upper plate.

The apparatus 10 also comprises an upper support plate 70 extending outwardly from the upper end of the plate 58, and a lower support plate 74 extending outwardly from the lower end of the plate 58. A rod 78 extends vertically between the plates 70 and 74 and is supported by the plates for pivotal movement relative thereto about a vertical axis 82. The rod 78 is releasably secured relative to the plates by an upper set screw 86 threaded into the upper plate 70 and by a lower set screw 90 threaded into the lower plate 74. Fixed to the rod 78 is the inner end of a swing arm or bar 94 having a horizontal longitudinal axis 98. The swing arm 94 pivots with the rod 78 about the axis 82. A support plate 102 is fixed to the outer end of the swing arm 94 and extends perpendicular to the swing arm axis 98.

Figure 7:
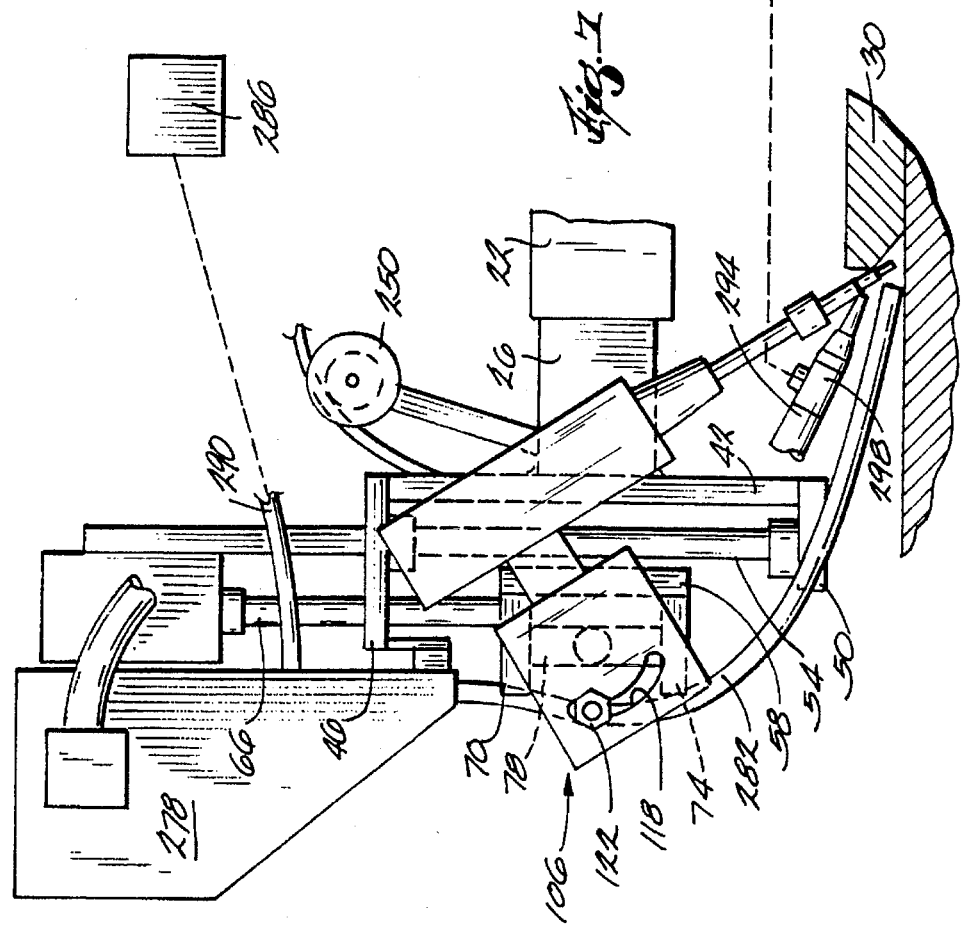
FIG. 7 is a portion of FIG. 1 showing the welding torch pivoted about the horizontal axis.

A support member 106 (see FIGS. 5 and 6) is mounted on the plate 102, and thus on the outer end of the swing arm 94, for pivotal movement relative thereto about the axis 98. The support member 106 is L-shaped and includes perpendicular plate portions 110 and 114. The shorter plate portion 110 abuts the support plate 102 and is pivotable relative thereto about the axis 98. The plate portion 110 has therein (see FIGS. 1 and 7) an arcuate slot 118 defining a portion of a circle centered on the axis 98, and a bolt 122 extends through the slot 118 and is threaded into the support plate 102. When the bolt 122 is tightened, the plate portion 110 is fixed relative to the support plate 102. When the bolt 122 is loosened, the plate portion 110 is pivotable relative to the support plate 102. Pivotal movement of the plate portion 110 relative to the support plate 102 is limited by engagement of the bolt 122 and the ends of the slot 118. The plate portion 110 is pivotable relative to the support plate 102 through a range of approximately 120°. The longer plate portion 114 extends parallel to and is closely spaced from the swing arm 94, as best shown in FIG. 6. Thus, the support member 106 is movable vertically relative to the boom 14 (due to vertical movement of the mounting plate 58), is pivotable relative to the boom 14 about the axis 82 (due to pivotal movement of the swing arm 94), and is pivotable relative to the boom 14 about the axis 98 (due to pivotal movement of the support member 106).

Lead and trail submerged-arc welding torches 126 and 130 (see FIG. 5) are fixed to the support member plate portion 114 for common movement therewith. The torches 126 and 130 are conventional and will not be described in greater detail. The torches 126 and 130 depend from the plate portion 114, as best shown in FIGS. 1 and 5. The angle of the torches 126 and 130 can be adjusted by adjusting the angle of the support member 106 relative to the boom 14. Power cables (not shown) for the torches 126 and 130 are supported by the boom 14. An electrode wire 134 (see FIG. 5) for the lead torch 126 is wound around a spool 138 (see FIG. 2), and an electrode wire 142 (see FIGS. 1 and 5) for the trail torch 130 is wound around a spool 146 (see FIGS. 1 and 2).

The spool 146 is mounted (see FIG. 2) on the vertical leg 150 of an L-shaped member 154 for rotation relative thereto about a horizontal axis 158. The member 154 has a horizontal leg defining a clevis 162. The horizontal leg 166 of an L-shaped member 170 is connected to the clevis 162, by a nut 174 and a bolt 178, such that the spool 146 and the member 154 can pivot relative to the member 170 about an axis 182. Pivotal movement of the spool 146 is permitted when the nut 174 is loose and is prevented when the nut 174 is tightened. A vertical plate 186 is fixedly mounted on the boom section 18, and the member 170 has a vertical leg 190 fixed to the vertical plate 186 such that the member 170 is fixed relative to the boom section 26. Accordingly, the spool 146 is supported by the boom 14 for rotation relative thereto about the axis 158 and for pivotal movement relative thereto about the axis 182.

The spool 138 is mounted on the vertical leg 194 of an L-shaped member 198 for rotation relative thereto about a horizontal axis 202. The member 198 has a horizontal leg 206. The horizontal leg 210 of an L-shaped member 214 is connected to the leg 206, by a nut 218 and a bolt 222, such that the spool 138 and the member 198 can pivot relative to the member 214 about an axis 226. The leg 210 has therein (see FIG. 3) an arcuate slot 230 defining a portion of a circle centered on the axis 226, and a bolt 234 (see FIGS. 2 and 3) extends through the slot 230 and is secured to the leg 206 by a nut 238. When the nut 238 is tightened, the leg 206 is fixed relative to the leg 210. When the nut 238 is loosened, the leg 206 is pivotable relative to the leg 210. Relative pivotal movement of the legs 206 and 210 is limited by engagement of the bolt 222 and the ends of the slot 230. The member 214 has a vertical leg 242 fixed to the boom section 18. Accordingly, the spool 138 is supported by the boom 14 for rotation relative thereto about the axis 202 and for pivotal movement relative thereto about the axis 226.

The wire 134 extends between the spool 138 and the lead torch 126, and the wire 142 extends between the spool 146 and the trail torch 130. Rollers 246 and 250 (see FIG. 5) mounted on the end of the boom 14 support the wires 134 and 142, respectively. Additional wire guides 254 are mounted on the boom section 22 to guide and support the wires 134 and 142. Each wire guide 254 includes (see FIGS. 1, 5 and 8) an arm 258 extending upwardly and outwardly from the boom section 22. A C-shaped piece of metal 262 is fixed to the outer end of the arm 258 and defines a slot 266 (see FIG. 8). A cylindrical piece of electrically insulating material 270 is housed by the C-shaped metal piece 262 and has therein a radial slot 274. The insulating material 270 is pivotable relative to the metal piece 262 to move the slot 274 into and out of alignment with the slot 266. With the slots 266 and 274 in alignment, the wire is passed through the slot 266 and into the slot 274. The insulating material 270 is then pivoted to move the slots 266 and 274 out of alignment so that the metal piece 262 traps the wire in the slot 274.

The apparatus 10 also comprises (see FIGS. 1, 5 and 7) a flux system including a flux hopper 278 supported by the outer end of the boom 14 for movement therewith. In the illustrated construction, the flux hopper 278 is fixedly mounted on the upper plate 46. The flux hopper 278 is conventional and will not be described in greater detail. A flux hose 282 has an inlet or upper end communicating with the hopper 278 and has an outlet or lower end adjacent the welding torches 126 and 130. As shown in FIG. 5, the outlet end of the hose 282 is slightly spaced from the lead torch 126 in the direction of travel, so that flux is deposited in front of the lead torch 126. A pressurized flux tank 286 (shown schematically in FIG. 7) is mounted on the boom 14 adjacent the inner end thereof. The tank 286 communicates with the inlet end of a flux supply hose 290 having an outlet end communicating with the hopper 278. A flux recovery hose 294 has an inlet end adjacent the welding torches 126 and 130. As best shown in FIG. 5, the inlet end of the hose 294 is spaced from the trail torch 130 in the direction opposite the direction of travel. The hose 294 has an outlet end communicating with the hopper 278, and the hose 294 has therein an air valve 298 (see FIGS. 1 and 7) communicating with a source 302 of compressed air (shown schematically in FIG. 7) for creating air flow in the hose 294 toward the outlet end or hopper 278, so that the inlet end of the hose 294 sucks up unused flux along the weld path. In order to provide optimal suction, the air valve 298 is closer to the inlet end than the outlet end.

The apparatus 10 operates as follows. After the workpiece 30 is leveled, the centering pin 34 is placed on the workpiece 30 in the center of the weld path. The boom 14 is then extended to the required length. The length of the boom 14 can be adjusted to provide weld diameters from two feet to seventeen feet. It may be necessary, when the boom 14 is fully extended, to provide support for the boom adjacent its outer end. This can be done, for example, with a jack (not shown) having its base mounted on rollers so that the jack can follow the boom 14 around its circular path. After the boom 14 is positioned, the mounting plate 58, the swing arm 94 and the support member 106 are located so that the torches 126 and 130 are properly aligned with the weld joint. The flux system and torches 126 and 130 are then powered up to start the submerged-arc welding process. The operator observes the operation and makes necessary adjustments to maintain the weld arc and location.

Various features of the invention are set forth in the following claims.

We claim:

1. Apparatus for making a circular weld using the submerged-arc welding process, said apparatus comprising a generally horizontal, extendible and contractible boom having inner and outer ends, said boom being supported adjacent said inner end for rotation about a vertical axis, a mounting member mounted on said outer end of said boom for vertical movement relative thereto, a swing arm having a generally horizontal longitudinal axis and inner and outer ends, said inner end of said swing arm being mounted on said mounting member for pivotal movement relative thereto about a generally vertical axis, a support member mounted on said outer end of said swing arm for pivotal movement relative thereto about a generally horizontal axis, a welding torch fixed to said support member for movement therewith, a spool supported by said boom for rotation relative thereto about a generally horizontal spool axis, and an electrode wire wound around said spool and extending between said spool and said torch.

2. Apparatus as set forth in claim 1 and further comprising a mechanism for selectively locking said swing arm in position relative to said mounting member.

3. Apparatus as set forth in claim 1 and further comprising a mechanism for selectively locking said support member in position relative to said swing arm.

4. Apparatus as set forth in claim 1 and further comprising an insulated wire guide mounted on said boom between said spool and said torch for supporting and guiding said wire.

5. Apparatus as set forth in claim 1 and further comprising a flux hopper supported by said outer end of said boom for movement therewith, and a flux hose having an inlet end communicating with said hopper and having an outlet end adjacent said welding torch.

6. Apparatus as set forth in claim 5 and further comprising a pressurized flux tank supported by said boom adjacent said inner end thereof, a flux supply hose having an inlet end communicating with said tank and having an outlet end communicating with said hopper, and a flux recovery hose having an inlet end adjacent said welding torch and having an outlet end communicating with said hopper, said flux recovery hose having therein an air valve communicating with a source of compressed air for creating air flow toward said outlet end of said recovery hose, the distance from said air valve to said outlet end being greater than the distance from said air valve to said inlet end.

7. An apparatus as set forth in claim 1 wherein said support member horizontally overlaps said swing arm.

8. Apparatus for making a circular weld using the submerged-arc welding process, said apparatus comprising a generally horizontal, extendible and contractible boom having inner and outer ends, said boom being supported adjacent said inner end for rotation about a vertical axis, a mounting member mounted on said outer end of said boom for vertical movement relative thereto, a swing arm mounted on said mounting member for pivotal movement relative thereto about a generally vertical axis, a support member mounted on said swing arm for pivotal movement relative thereto about a generally horizontal axis, a welding torch fixed to said support member for movement therewith, a spool supported by said boom for rotation relative thereto about a generally horizontal spool axis, an electrode wire wound around said spool and extending between said spool and said torch, and an insulated wire guide mounted on said boom between said spool and said torch for supporting and guiding said wire, wherein said wire guide includes an arm extending from said boom, a C-shaped member which is fixed to said arm and which defines a first slot, and a cylindrical piece of electrically insulating material which is housed by said C-shaped member, which has therein a radial second slot, and which is pivotable relative to said C-shaped member to move said second slot into and out of alignment with said first slot, such that said wire can be passed through said first slot and into said second slot when said slots are in alignment, and such that said insulating material can then be pivoted to move said slots out of alignment so that said C-shaped member traps said wire in said second slot.

9. Apparatus for making a circular weld using the submerged-arc welding process, said apparatus comprising a generally horizontal, extendible and contractible boom having inner and outer ends, said boom being supported adjacent said inner end for rotation about a vertical axis, a welding torch adjustably supported by said outer end of said boom, a spool supported by said boom for rotation relative thereto about a generally horizontal spool axis and for pivotal movement thereto about a generally vertical axis such that the position of said spool relative to said boom can be adjusted to compensate for movement of said torch relative to said boom, and an electrode wire wound around said spool and extending between said spool and said torch.

10. Apparatus as set forth in claim 9 and further comprising an insulated wire guide mounted on said boom between said spool and said torch for supporting and guiding said wire.

11. Apparatus as set forth in claim 9 and further comprising a flux hopper supported by said outer end of said boom for movement therewith, and a flux hose having an inlet end communicating with said hopper and having an outlet end adjacent said welding torch.

12. Apparatus as set forth in claim 11 and further comprising a pressurized flux tank supported by said boom adjacent said inner end thereof, a flux supply hose having an inlet end communicating with said tank and having an outlet end communicating with said hopper, and a flux recovery hose having an inlet end adjacent said welding torch and having an outlet end communicating with said hopper, said flux recovery hose having therein an air valve communicating with a source of compressed air for creating air flow toward said outlet end of said recovery hose, the distance from said air valve to said outlet end being greater than the distance from said air valve to said inlet end.

13. Apparatus for making a circular weld using the submerged-arc welding process, said apparatus comprising a generally horizontal, extendible and contractible boom having inner and outer ends, said boom being supported adjacent said inner end for rotation about a vertical axis, a welding torch adjustably supported by said outer end of said boom, a spool supported by said boom for rotation relative thereto about a generally horizontal spool axis and for pivotal movement thereto about a generally vertical axis such that the position of said spool relative to said boom can be adjusted to compensate for movement of said torch relative to said boom, an electrode wire wound around said spool and extending between said spool and said torch, an inner spool support member fixed to said boom, and an outer spool support member mounted on said inner spool support member for pivotal movement relative thereto about said vertical axis, and wherein said spool is mounted on said outer spool support member for rotation relative thereto about said spool axis.

14. Apparatus as set forth in claim 13 and further comprising a mechanism for selectively locking said outer spool support member in position relative to said inner spool support member.

15. Apparatus for making a circular weld using the submerged-arc welding process, said apparatus comprising a generally horizontal, extendible and contractible boom having inner and outer ends, said boom being supported adjacent said inner end for rotation about a vertical axis, a welding torch adjustably supported by said outer end of said boom, a spool supported by said boom for rotation relative thereto about a generally horizontal spool axis and for pivotal movement thereto about a generally vertical axis such that the position of said spool relative to said boom can be adjusted to compensate for movement of said torch relative to said boom, an electrode wire wound around said spool and extending between said spool and said torch, and an insulated wire guide mounted on said boom between said spool and said torch for supporting and guiding said wire, wherein said wire guide includes an arm extending from said boom, a C-shaped member which is fixed to said arm and which defines a first slot, and a cylindrical piece of electrically insulating material which is housed by said C-shaped member, which has therein a radial second slot, and which is pivotable relative to said C-shaped member to move said second slot into and out of alignment with said first slot, such that said wire can be passed through said first slot and into said second slot when said slots are in alignment, and such that said insulating material can then be pivoted to move said slots out of alignment so that said C-shaped member traps said wire in said second slot.

16. Apparatus for making a circular weld using the submerged-arc welding process, said apparatus comprising a generally horizontal, extendible and contractible boom having inner and outer ends, said boom being supported adjacent said inner end for rotation about a vertical axis, a mounting member mounted on said outer end of said boom for vertical movement relative thereto, a swing arm having a generally horizontal longitudinal axis and inner and outer ends, said inner end of said swing arm being mounted on said mounting member for pivotal movement relative thereto about a generally vertical axis, a support member mounted on said outer end of said swing arm for pivotal movement relative thereto about a generally horizontal axis, a welding torch fixed to said support member for movement therewith, a spool supported by said boom for rotation relative thereto about a generally horizontal spool axis and for pivotal movement thereto about a generally vertical axis, an electrode wire wound around said spool and extending between said spool and said torch, an insulated wire guide mounted on said boom between said spool and said torch for supporting and guiding said wire, a flux hopper supported by said outer end of said boom for movement therewith, a flux hose having an inlet end communicating with said hopper and having an outlet end adjacent said welding torch, a pressurized flux tank supported by said boom adjacent said inner end thereof, a flux supply hose having an inlet end communicating with said tank and having an outlet end communicating with said hopper, and a flux recovery hose having an inlet end adjacent said welding torch and having an outlet end communicating with said hopper, said flux recovery hose having therein an air valve communicating with a source of compressed air for creating air flow toward said outlet end of said recovery hose, the distance from said air valve to said outlet end being greater than the distance from said air valve to said inlet end.

17. An apparatus as set forth in claim 16 wherein said support member horizontally overlaps said swing arm.

18. Apparatus for making a circular weld using the submerged-arc welding process, said apparatus comprising a generally horizontal, extendible and contractible boom having inner and outer ends, said boom being supported adjacent said inner end for rotation about a vertical axis, a mounting member mounted on said outer end of said boom for vertical movement relative thereto, a swing arm mounted on said mounting member for pivotal movement relative thereto about a generally vertical axis, a support member mounted on said swing arm for pivotal movement relative thereto about a generally horizontal axis, a welding torch fixed to said support member for movement therewith, a spool supported by said boom for rotation relative thereto about a generally horizontal spool axis and for pivotal movement thereto about a generally vertical axis, an electrode wire wound around said spool and extending between said spool and said torch, an insulated wire guide mounted on said boom between said spool and said torch for supporting and guiding said wire, a flux hopper supported by said outer end of said boom for movement therewith, a flux hose having an inlet end communicating with said hopper and having an outlet end adjacent said welding torch, a pressurized flux tank supported by said boom adjacent said inner end thereof, a flux supply hose having an inlet end communicating with said tank and having an outlet end communicating with said hopper, and a flux recovery hose having an inlet end adjacent said welding torch and having an outlet end communicating with said hopper, said flux recovery hose having therein an air valve communicating with a source of compressed air for creating air flow toward said outlet end of said recovery hose, the distance from said air valve to said outlet end being greater than the distance from said air valve to said inlet end, wherein said wire guide includes an arm extending from said boom, a C-shaped member which is fixed to said arm and which defines a first slot, and a cylindrical piece of electrically insulating material which is housed by said C-shaped member, which has therein a radial second slot, and which is pivotable relative to said C-shaped member to move said second slot into and out of alignment with said first slot, such that said wire can be passed through said first slot and into said second slot when said slots are in alignment, and such that said insulating material can then be pivoted to move said slots out of alignment so that said C-shaped member traps said wire in said second slot.

* * * * *